US006207046B1

(12) United States Patent
Yamashita et al.

(10) Patent No.: US 6,207,046 B1
(45) Date of Patent: Mar. 27, 2001

(54) DRINKING WATER DISPENSER

(75) Inventors: Tomohiro Yamashita, Gifu; Kenji Nishikawa; Shinichi Kunisaki, both of Tokyo, all of (JP)

(73) Assignees: Suntory Limited, Osaka; FujiElectric Co., Ltd., Kanagawa, both of (JP)

( * ) Notice: Subject to any disclaimer, the term of this patent is extended or adjusted under 35 U.S.C. 154(b) by 0 days.

(21) Appl. No.: 09/341,558

(22) PCT Filed: Dec. 25, 1998

(86) PCT No.: PCT/JP98/05892

§ 371 Date: Jul. 12, 1999

§ 102(e) Date: Jul. 12, 1999

(87) PCT Pub. No.: WO99/33745

PCT Pub. Date: Aug. 7, 1999

(30) Foreign Application Priority Data

Dec. 26, 1997 (JP) ..................................................... 9-358667

(51) Int. Cl.[7] ..................................................... B01D 17/12

(52) U.S. Cl. .................... 210/138; 210/257.1; 222/146.1; 62/339; 62/389; 422/38

(58) Field of Search ............................ 62/389, 390, 339; 222/146.1, 189.06; 210/175, 184, 257.1, 257.2, 138, 232; 422/38

(56) References Cited

U.S. PATENT DOCUMENTS 4,881,380 * 11/1989 Mrugala et al. ........................ 62/389
5,043,066 * 8/1991 Miller et al. ...................... 210/257.2
5,454,944 * 10/1995 Clack ............................... 210/257.2
5,582,717 * 12/1996 Di Santo ........................... 210/257.2
5,707,518 * 1/1998 Coates et al. .......................... 62/389
5,766,453 * 6/1998 Morellato et al. ................... 210/175
5,855,795 * 1/1999 Chang .............................. 222/146.1

FOREIGN PATENT DOCUMENTS 2101212 7/1993 (CA) .
648488 2/1994 (JP) .
9407793 4/1994 (WO) .

* cited by examiner

*Primary Examiner*—Joseph W. Drodge
(74) *Attorney, Agent, or Firm*—Bachman & LaPointe, P.C.

(57) ABSTRACT

A drinking water dispenser according to the present invention functions to supply drinking water from a detachable water container. The drinking water dispenser includes a hot water tank, a chilled water tank, a supply pipe and a sterilization system. The hot water tank heats and stores the drinking water supplied from the water container. The supply pipe connects the water container with the hot water tank and the chilled water tank. The sterilization system sterilizes the tanks and the supply pipe by circulating hot water from the hot water tank among them. The dispenser is also sterilized because of its including a special 3 way connector between the detachable container and tanks which allows connector and container to be housed in a refrigerator, thus separating critical system components from warmer outside air and thus suppressing invasion and growth of microbes.

9 Claims, 12 Drawing Sheets

DRINKING WATER DISPENSER

BACKGROUND OF THE INVENTION

The present invention relates a dispenser for supplying drinking water, and more particularly to a drinking water dispenser which can always supply hot water and chilled water. Further, it is arranged to enable heat sterilization of storage tanks and a piping system in the dispenser and to suppress the microorganisms invasion of the dispenser. This arrangement improves the degree of safety in disinfection control and maintains natural character of the drinking water supplied from the dispenser. Furthermore, this improves an operational ability such as an installation of the drinking water container and the size of the dispenser.

Various types of a dispenser for supplying drinking water have been already marketed. According to the increase of users' interest with respect to drinking water, the demands to ensure safety of drinking water and to pursue the quality in natural character of drinking water have been increased. As to ensuring safety of drinking water, in case of a dispenser for supplying tap water, since the tap water has some sterilization function by means of remained chlorine added in the tap water for disinfection, the growth of the microbe in the tap water is suppressed and therefore the ensuring of the safety is kept.

However, in case of drinking water such as natural mineral water, since chlorine for disinfection is not added in the drinking water, it is important to take account of the growth of microbe in the drinking water. The growth of microbe in the drinking water is harmful if the microbe is pathogenicity. Even if the microbe is not pathogenicity, it may apply strange taste and odor to the drinking water or make the drinking water turbid. The growth of microbe in the dispenser is prevented by always continuously supplying the drinking water. However, if the drinking water rested in the dispenser for a long time such as a night or week end in case of use in an office, there is a possibility that microbe grows in the drinking water. Also, the colony of microbe may grow in the dispenser as a result of long term use.

Conventionally, in order to suppress the growth of microbe in the dispenser, there have been proposed a lot of dispensers which are arranged to execute sterilization by pouring germicide or high-temperature water from external to a piping system thereof and by circulating it, or dispensers which are arranged to provide a filtering device for removing microbial contaminants therefrom. However, pouring germicide or high-temperature water into the piping system of the dispenser requires providing an apparatus for pouring such germicide in the dispenser and for discharging it after the circulation and a space for pouring and discharging such germicide. Further, the operation thereof is complicated and takes predetermined time. Furthermore, after the use of germicide, it was necessary to wash the germicide out. In case of a filtering apparatus, maintenance of a filter thereof is complicated and there is a problem that the microbe caught by the filtering apparatus may grow and increase colony in the filtering apparatus.

Therefore, the inventors of the present invention have proposed a dispenser for supplying drinking water from a previously drinking water packaged container, as disclosed in Japanese Patent Provisional Publication No. 6-48488. The proposed drinking water dispenser comprises a cooling system for cooling a drinking water packaged container and a tank for storing drinking water in a piping system and a sterilization system for executing heat sterilization of the piping system by means of a heater used heating device or hot water flowing device. Such a heat sterilization system is controlled by an automatic execution device. By the provision of this sterilization system, the drinking water dispenser sterilizes microbe grown in the dispenser, provides a simple and effective sterilization method and supplies safety guaranteed drinking water usually set in hot or chilled condition.

However, since this conventional drinking water dispenser is arranged to have a heater in each of a piping system, a cool water tank and a hot water tank, it is necessary to ensure a large space for the heaters and to consume lot of electric power. Accordingly, this invites the increase of the cost for producing the dispenser and of the running cost of the dispenser. Although the heat sterilization method of this conventional drinking water dispenser functions effectively as a sterilization method having sufficient merits, there is a part which is not heated due to the detailed structure of the conventional dispenser. Therefore, the sterilization thereof has been sometimes executed insufficiently. For example, the conventional drinking water dispenser is arranged to connect the portions from the drinking water container to the piping system by means of I-type joints. Although this joint is usually employed to facilitate the arrangement of hoses and to simplify the structure in the dispenser, the hot water does not flow through the I-type joint itself and therefore the I-type joint is not heat sterilized by the hot water.

Generally, in case of the contaminating of a small amount of microbe or contaminating of non disease-causing microbe, the safety of the drinking water is ensured by heat sterilizing the microbe contaminated in the dispenser. However, in case of the contaminating of a lot of microbe or contaminating of pathogenic microbe, the safety of the drinking water is degraded by the contaminating of the microbe, and the quality in natural character of the drinking water may be degraded. In order to keep the safety and the quality in the natural character of the drinking water, it is necessary to provide a sterilization means which prevents the contamination of microbe into the dispenser as possible and avoids heating sterilization from being frequently executed. Further, it is necessary to facilitate the maintenance of the dispenser and to prevent the degradation of each part of the dispenser. Furthermore, in case that the dispenser is used as a dispenser for supplying drinking water, more particularly, in case that it is used as a dispenser for supplying drinking water which has a very delicate taste and odor and tends to be affected in natural character like as natural mineral water, it is important to pay attention to a slight addition of the strange taste and odor from parts contacted to the drinking water. Furthermore, the dispenser is required to have a good controllability, to be treated easily and to have a compact appearance which does not require a large space.

SUMMARY OF THE INVENTION

It is therefore an object of the present invention to provide an improved drinking water dispenser which improves the degree of safety in disinfection control by means of heat sterilization and maintains natural character of the drinking water supplied from the dispenser. Further, the improved drinking water dispenser improves an operational ability such as an installation of the drinking water container and the size thereof.

A drinking water dispenser according to the present invention functions to supply drinking water from a detachable water container. The drinking water dispenser comprises a hot water tank, a chilled water tank, a supply pipe and a sterilization system. The hot water tank heats and stores the drinking water supplied from the water container. The chilled water tank cools and stores the drinking water supplied from the water container. The supply pipe connects the water container with the hot water tank and the chilled water tank. The sterilization system sterilizes the hot water tank, the chilled water tank and the supply pipe by circulating hot water of the hot water tank among them.

DETAILED DESCRIPTION OF THE INVENTION

Figure 1:
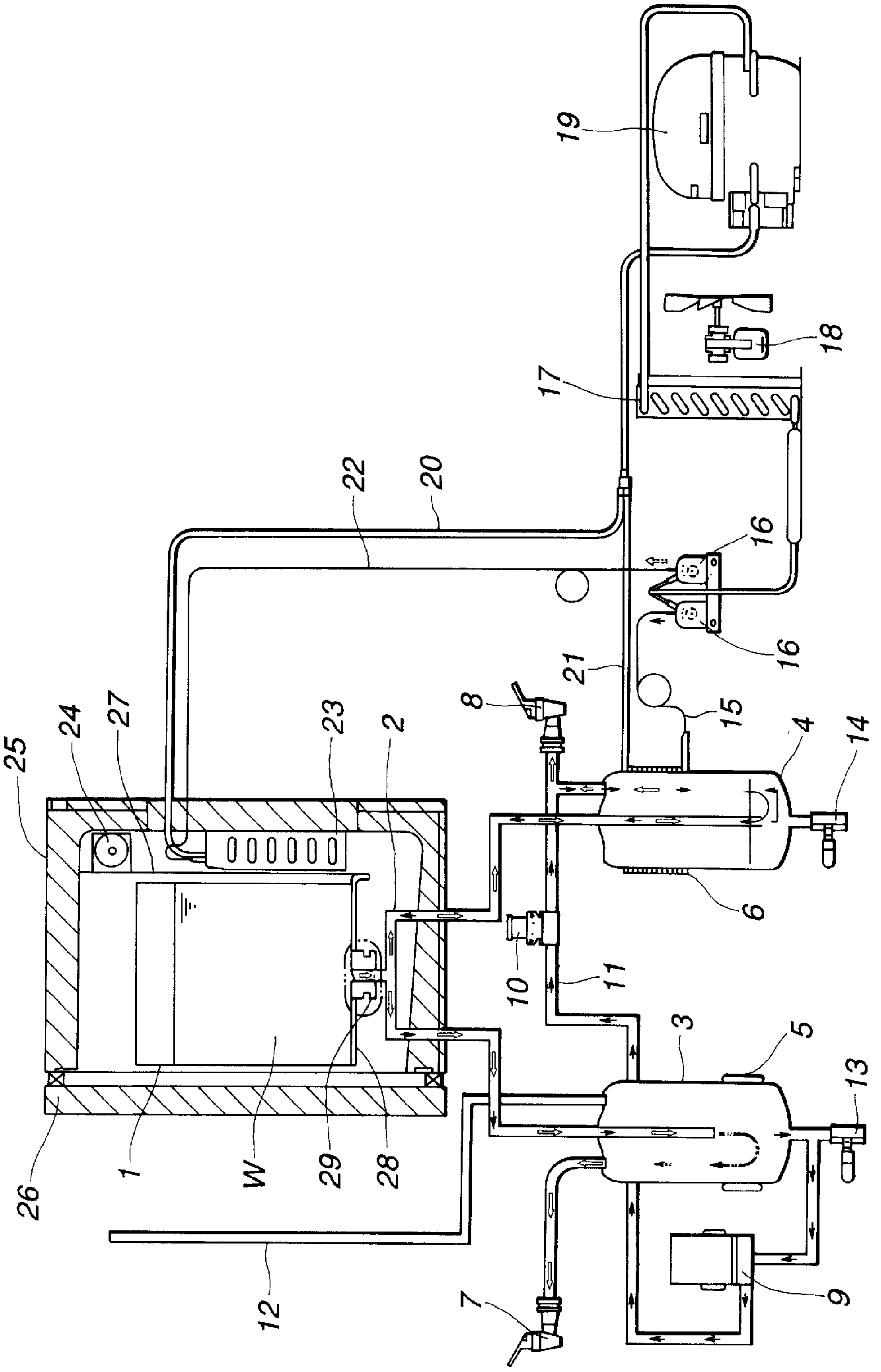
FIG. 1 is a schematic view showing a structure of a dispenser according to the present invention.

Referring to FIGS. 1 to 15, there is shown an embodiment of a drinking water dispenser according to the present invention. As shown in FIG. 1, a drinking water container 1 such as a bag in box type container (BIB container) is received in a refrigerator 25. The BIB container 1 supplies drinking water to two kinds of storage tanks such as a hot water tank 3 and a chilled water tank 4 through a supply pipe 2 by means of gravity. A heater 5 installed in the hot water tank 3 heats the drinking water, and a cooler 6 installed in the chilled water tank 4 cools the drinking water. The hot water is poured from a hot water pouring faucet 7 connected to the hot water tank 3, and the chilled water is poured from a chilled water pouring faucet 8 connected to the chilled water tank 4. Further, a connecting pipe 11 connects the hot water tank 3 and the chilled water tank 4. A circulating pump 9 and a circulating solenoid valve 10 are disposed in the connecting pipe 11 as shown in FIG. 1. Therefore, when the heat sterilization is executed, the hot water pouring faucet 7 and the chilled water pouring faucet 8 are closed, the circulating solenoid valve 10 is opened, and the circulating pump 9 is operated. With these operations, hot water flowed out from the hot water tank 3 circulates in the connecting pipe 11, the chilled water tank 4 and the supply pipe 2 in the order of mention. During the heat sterilization, the hot water circulated through a heat sterilization circuit in the dispenser is heated by the heater 5 installed in the hot water tank 3 so that the temperature of the hot water is greater than or equal to 70° C. That is, the sterilization of inner portions of the pipes 2, 11 is executed by the hot water kept at a temperature necessary for the heat sterilization. As is clear from the above explanation, the hot water tank 3, the connecting pipe 11, the circulating pump 9 and the circulating solenoid valve 10 constitute a heat sterilization system.

Further attached in the hot tank 3 are a steam purge pipe 12 for purging steam in the hot water tank 3 and a hot water drain valve 13 for draining hot water in the hot water tank 3. Attached in the chilled water tank 4 is a chilled water drain valve 14. The dispenser comprises a refrigeration system for cooling the chilled water tank 4 and the refrigerator 25. The refrigeration system comprises an electric compressor 19 which pressurizes and discharges refrigerant to a condenser 17. The refrigerant is liquefied in the condenser 17, and the condenser 17 is cooled by the electric motor fan 18. The liquefied refrigerant is supplied through a selector electromagnetic solenoid valve 16, refrigerant supply pipes 15 and 22 to the cooler 6 and an evaporator 23 installed in the refrigerator 25, respectively. The selector electromagnetic solenoid valve 16 is arranged to control the supply of the refrigerant to the cooler 6 and the evaporator 23 so as to prevent the temperature in the refrigerator 25 or the temperature of the chilled water tank 4 from becoming greater than or equal to a preset value. Refrigerant drain pipes 20 and 21 are connected to the cooler 6 and the evaporator 23 to return the refrigerant to the compressor 19.

The refrigerator 25 comprises the evaporator 23, a refrigerator fan motor 24, a door 26, a partition wall 27 for partitioning an inner space of the refrigerator 25, and a shelf board 28 for setting the drinking water container.

The drinking water contain 1 set in the dispenser according to the present invention is a sealed container which is of a bag in box type container (BIB container). An outlet port 29 connected to an inner bag of the BIB container 1 is connected to the supply pipe 2 in the refrigerator 25. The outlet port 29 is formed into a neck shaped portion, and a removable seal 29*b* is attached on a top surface the neck shaped portion. A sealing film 29*c* is set at an inner-deep portion of the neck shaped portion. The drinking water was filled the BIB container 1 with in an aseptic condition, and the sealing film 29*c* and the removable seal 29*b* keep the sterility in the BIB container 1. When the drinking water container 1 is connected to the supply pipe 2 of the dispenser, the removable seal 29*b* is removed. The refrigerator 25 storing the BIB container 1 is cooled by the refrigeration system including the evaporator 23 and the refrigeration fan motor 24 so as to cool the drinking water in the BIB container 1 at about 4 to 10° C.

The purpose of this refrigeration system is to set the drinking water at a suitable cold temperature for drinking and to store the drinking water at a microbe suppressed state so as to reduce the possibility of the contamination of the drinking water in the BIB container 1 by microbe. Further, since the connecting portion between the BIB container 1 and the dispenser is put in the refrigerator so as to be separated from outside air and to be put in a cold temperature circumstance, the invasion and the growth of microbe is suppressed.

Conventionally, although a connector of the dispenser connects to the BIB container outlet port through a supply hose is attached to the dispenser, this has generated the invasion of microbe during the connecting operation of the drinking water container or the contamination of the connecting portion by microbe. Because the connector of the drinking water container is treated by hands. That is, such a conventional connecting operation is not sanitary. In case that a bottle well-seen in the United State or Europe is used as a bottled drinking water container, a mechanism therefor is arranged to open a plug of an outlet port of the bottle and to insert the outlet port of the inverted bottle to a water supply reservoir installed at an upper portion of the dispenser. However, such a conventional water supply reservoir of the dispenser and the outlet port of the bottle are exposed in outside air, and the connecting portion therebetween is not shut from outside air even under the connected condition. Therefore, in case of such a conventional well-seen bottle, the invasion of and attaching of microbe into the water container and dispenser tend to be generated.

Figure 3A:
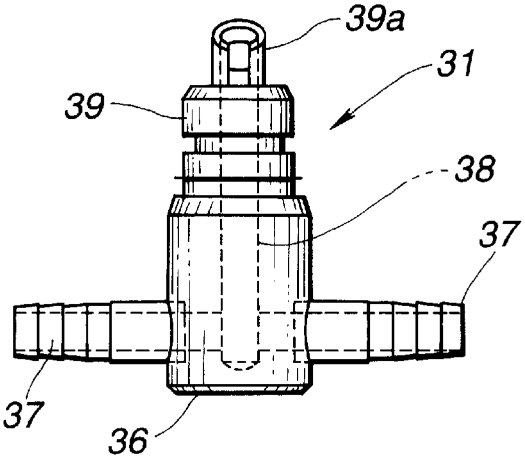
FIG. 3A is a front view showing a three-way connector of the dispenser of FIG. 1.
Figure 3B:
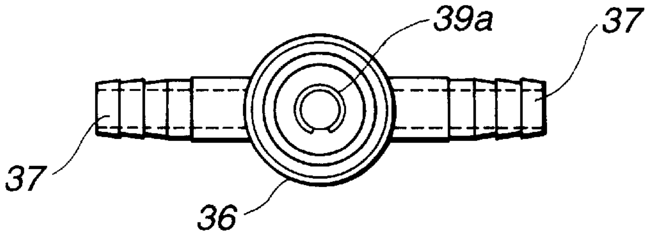
FIG. 3B is a top view of the three-way connector.
Figure 3C:
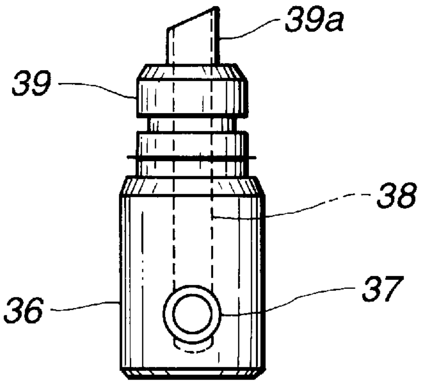
FIG. 3C is a side view of the three-way connector.
Figure 4:
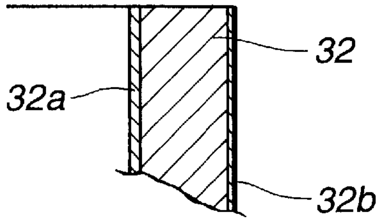
FIG. 4 is a partial cross-sectional view of a hose employed in the piping system of the dispenser according to the present invention.

Next, the piping system of the dispenser according to the present invention will be explained in detail with reference to FIG. 2. The supply pipe 2 is arranged such that a pair of hoses 32 and 32 are fixedly connected to a three-way connector 31 by means of clamps 33 and 33. The three-way connector 31 is inserted to the outlet port 29 of the BIB container 1 and is sealed by an O-ring 30. Each of the hoses 32 and 32 is fixedly connected to each pipe 34 by means of each clamp 35. The three-way connector 31 is made of stainless steel and is arranged, as shown in FIGS. 3A to 3C to have two connecting pipe portions 37 and 37 projected from a main body 36 to both lateral sides. Further, the three-way connector 31 has a T-shaped through hole 38 and a tapered cylindrical portion 39 including a sharp end portion 39*a* for breaking through the sealed film 29*c* of the BIB container outlet port 29. The three-way connector 31 is disposed in the vicinity of the outlet port 29 such that the heat sterilization by the circulation of the hot water is executed even near an end portion of the dispenser. Since the three-way connector 31 is made of metal, a portion near the outlet port 29 is sterilized due to the heat conductivity of the three-way connector 31. The O-ring 30 is made of silicone rubber and is disposed in a recess portion of the tapered cylindrical portion 39 of the three-way connector 31 so as to prevent the O-ring 30 from easily moving vertically. Therefore, when the tapered cylindrical portion 39 is connected to the outlet port 29 of the BIB container 1, the O-ring 30 functions to prevent the leakage of the drinking water at the connecting portion. The hose 32 is made of rubber or synthetic resin such as SEBS, and its inner and outer surfaces are coated by LLDPE coatings 32*a* and 32*b* as shown in FIG. 4 showing a vertical cross sectional structure. The thickness of the coating 32*b* of the outer surface is thinner than the coating 32*a* of the inner surface. The pipes 34 are made of stainless steel.

Figure 2:
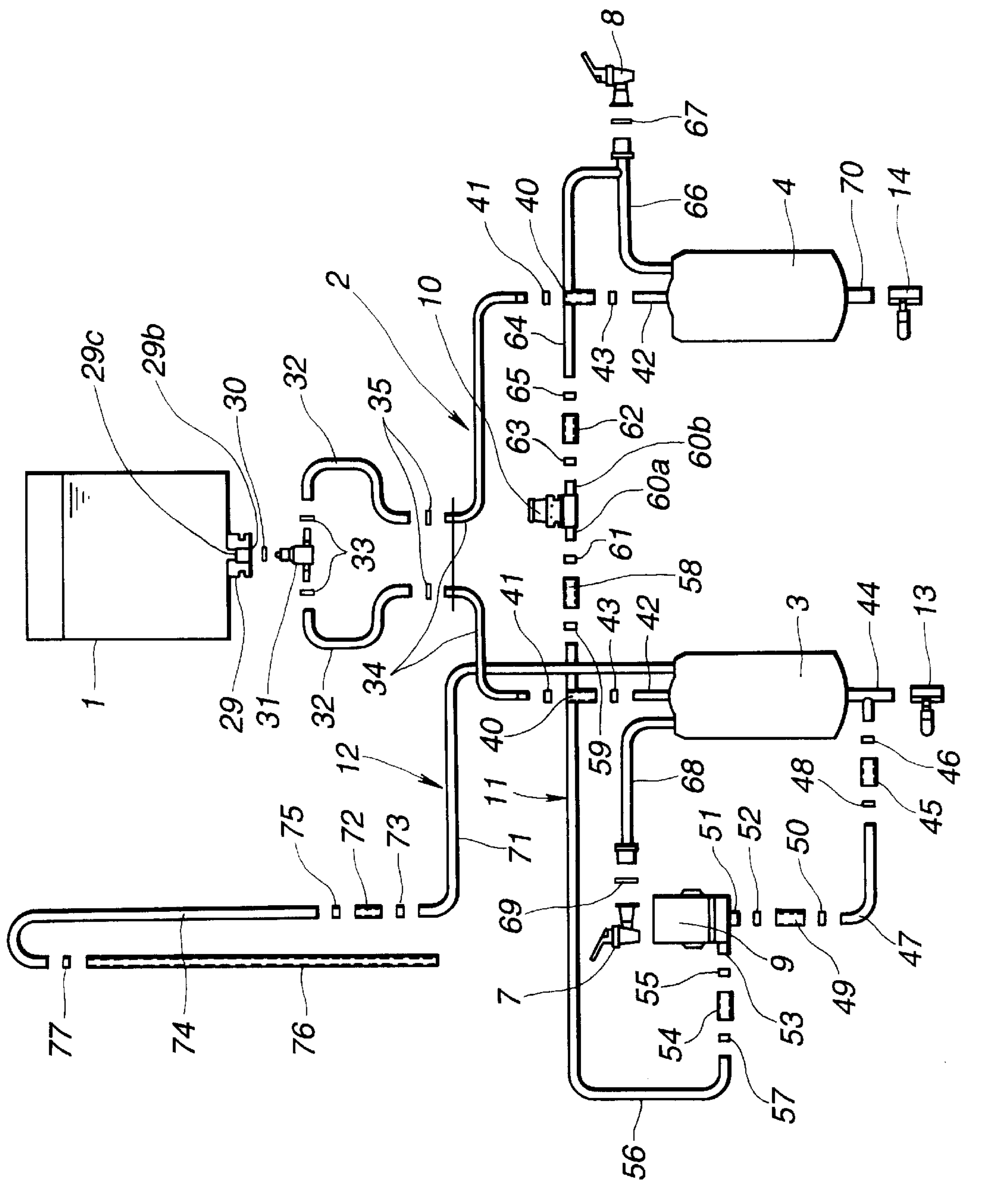
FIG. 2 is an exploded view of a piping system of the dispenser of FIG. 1.

Again, as shown in FIG. 2, the pipes 34 and 34 are fixedly connected to hoses 40 and 40, respectively, by means of clamps 41. The hoses 40 and 40 are fixedly connected to pipes 42 and 42 projected from the hot water tank 3 and the chilled water tank 4 by means of clamps 43 and 43, respectively. The connecting pipe system 11 is arranged to fixedly connect a hose 45 with a T-shaped pipe 44 projected from a bottom portion of the hot water tank 3 by means of a clamp 46, to fixedly connect a pipe 47 with the hose 45 by means of a clamp 48, and to fixedly connect a hose 49 with the pipe 47 by means of a clamp 50. The hose 49 is fixedly connected to an inlet port 51 of the circulating pump 9 by means of a clamp 52. An outlet port 53 of the circulating pump 9 is fixedly connected to a hose 54 by means of a clamp 55. Further, the hose 54 is fixedly connected with a pipe 56 by means of a clamp 57. Furthermore, the pipe 56 is fixedly connected to a hose 58 by means of a clamp 59, and the hose 58 is fixedly connected to an inlet port 60*a* of the circulating solenoid valve 10 by means of a clamp 61. The hoses 40, 45, 49, 54 and 58 are made of material as same as that of the hose 32. The pipes 42, 47 and 56 are made of material as same as that of the pipe 34. The circulating pump 9 is arranged such that a casing and an impeller thereof are made of glass-fiber reinforced PP, a spindle is made of ceramics, a thrust is made of polyethylene, a O-ring is made of fluoro rubber, and a bearing is made of Rulon-alloy. The circulating solenoid valve 10 is constructed such that a body thereof is made of polyacetal, a valve sheet and a packing are made of silicone rubber, a guide and a spring are made of stainless steel, and a plunger is made of stainless steel.

Figure 5A:
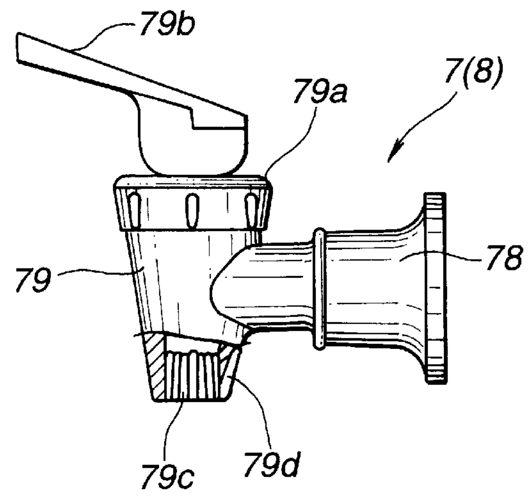
FIG. 5A is a side view of a water pouring faucet of the dispenser of FIG. 1.
Figure 5B:
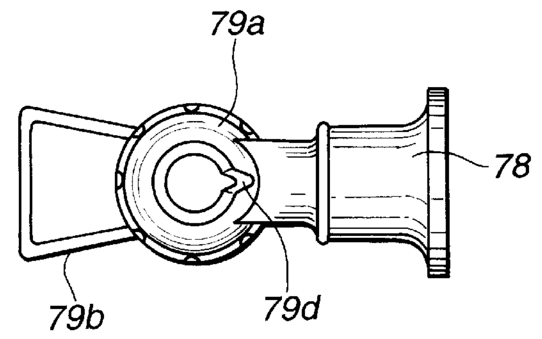
FIG. 5B is a bottom view of the water pouring faucet.
Figure 5C:
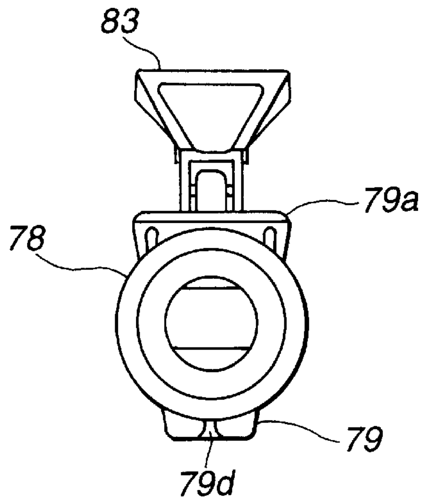
FIG. 5C is a back view of the water pouring faucet.
Figure 6:
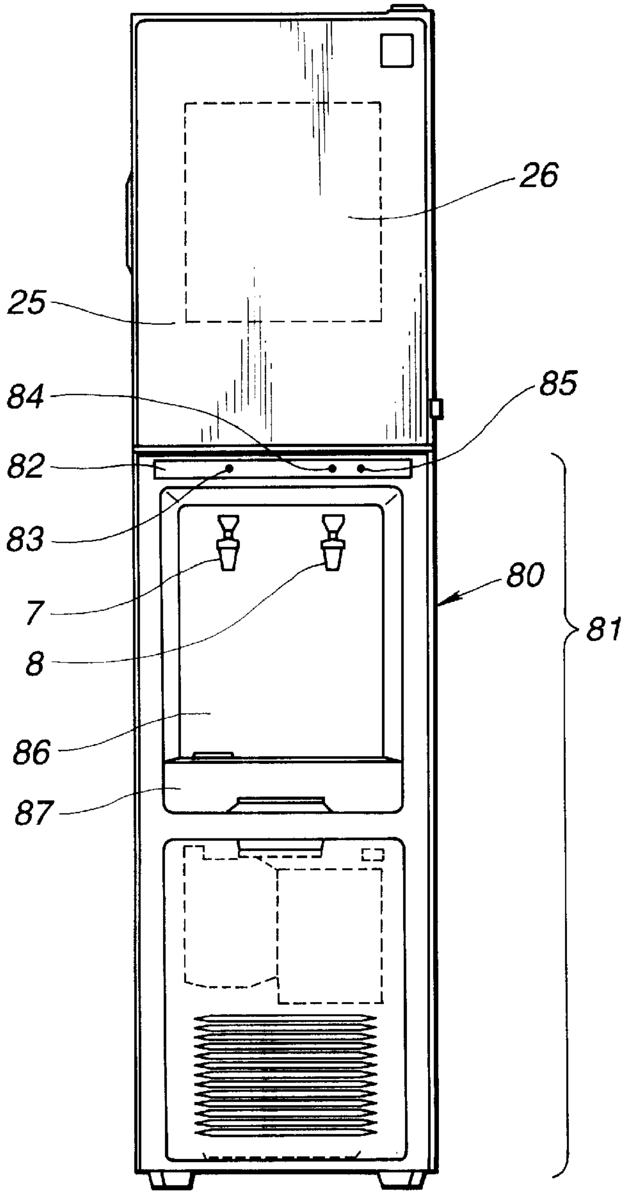
FIG. 6 is a front view of a water server of an embodiment of the dispenser according to the present invention.
Figure 7:
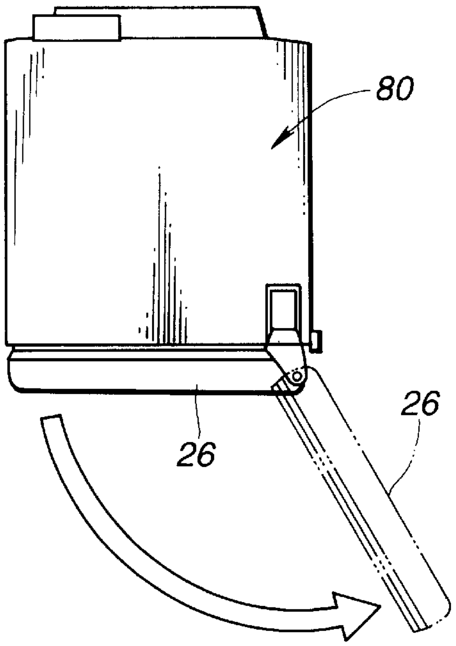
FIG. 7 is a top view of the water server of FIG. 6.

An outlet port 60*b* of the circulating solenoid valve 10 is fixedly connected to a hose 62 by means of a clamp 63. The hose 62 is fixedly connected to a pipe 64 branched from a pipe 66 projected from the chilled water tank 4 by means of a clamp 65. The chilled water pouring faucet 8 is installed in the vicinity of the piping system so that the heat sterilization thereof is easily executed. The chilled water pouring faucet 8 is connected to the pipe 66 through a packing 67. The hot water pouring faucet 7, which is the same as the chilled water pouring faucet 8, is connected to a pipe 68 projected from the hot water tank 3 through a packing 69. As shown in FIGS. 5A to 5C, each of the hot water and chilled water pouring faucets 7 and 8 is arranged such that a connecting pipe portion 78 is integrally connected with a main body 79 to form an L-shape appearance. A cutout portion such as a slit 79*d* is formed at a tip end portion of a water outlet 79*c* of the main body 79. Therefore, a surface tension of water at the tip end portion of the water outlet 79*c* is suppressed, and the water rested in the vicinity of the water outlet 79*c* tends to be discharged. That is, the water dripping performance of the dispenser according to the present invention is improved. Since the portion in the vicinity of the water outlet 79*c* is exposed in outside air, the resting of water at there extremely tends to cause the invasion and the growth of microbe. Therefore, this cut portion structure is very effective to prevent the invasion and the growth of microbe.

A drain pipe 70 is downwardly projected from the bottom portion of the chilled water tank 4, and a chilled water drain valve 14 is connected to the drain pipe 70. The hot water drain valve 13 is the same as the chilled water drain valve 14. The steam purge pipe 12 for the hot water tank 3 is arranged such that a stainless steel pipe 71 projected from the hot water tank 3 is fixedly connected to a hose 72 by means of a clamp 73, the hose 72 is fixedly connected to a pipe 74 by means of a clamp 75, and the pipe 74 is fixedly connected to a hose 76 by means of a clamp 77. The pouring faucets 7 and 8 are made of synthetic resin such as polysulfone, the hot water tank 3 and the chilled water tank 4 are made of stainless steel, the pipes 64 and 66 are the same as the material of the tanks 3 and 4, the packings 67 and 69 are made of silicone rubber.

The drain valves 13 and 14 are made of brass so that the heat sterilization thereof is executed by utilizing the heat conduction of the material when the heat sterilization of the system is executed by circulating hot water. It is important that the material of parts contacting with drinking water in the dispenser is selected on the basis of the functions of the parts to be performed in the dispenser. Further, it is important that the parts are sanitary with respect to drinking water, and do not affect the natural character of drinking water.

However, the conventional dispenser has not taken account of the affectation of the selected material to the natural character of drinking water. Therefore, strange odor such as metal-like smell or rubber-like odor and strange taste due to metals have been frequently added to drinking water. More particularly, in case of drinking water having delicate flavor and taste such as natural mineral water, it is necessary to keep its flavor and taste. Therefore, the materials of the hot water tank, the chilled water tank and the pipes of the piping system are selected so as to satisfy the corrosion resistance, the heat conductivity and the aging deterioration durability and not to affect the natural character of drinking water.

Accordingly, the dispenser according to the present invention is arranged to use stainless steel therefor. For example, SUS316 and SUS304 (kinds of stainless steel defined by Japanese Industrial Standard) are preferably used in the pipes and tanks of the dispenser according to the present invention. Further, the material of the hoses should be selected so as to satisfy the flexibility, inner-space keeping performance even under a vent condition, high-temperature resistance and low-temperature resistance and to have a low adsorption characteristic with respect to strange taste and odor. Therefore, silicone rubber and SEBS are used as the material of the hoses of the dispenser according to the present invention. In order to suppress the affection to the natural character as possible, it is preferable to use the material coated by LLDPE. As a coating method, it is preferable to the simultaneous extruding method since using of adhesive is not appropriate in view of the safety and affectation to the natural character of drinking water.

As to the O-rings, the packings and the valves of the solenoid valves of the dispenser according to the present invention, silicone rubber or fluoro rubber is selected in view of satisfying high-temperature durability and low-temperature durability and having low adsorption characteristic to strange taste and odor material. As to the hot water pouring faucet 7 and the chilled water pouring faucet 8, polysulfone or PP is selected in view of satisfying high-temperature durability and low-temperature durability, dimensional accuracy and external appearance and having low adsorption characteristic to strange taste and odor material. As to the valve of the water pouring faucet, silicone rubber or fluoro rubber is selected in view of shape recovery performance against deformation, crack resistance and high-temperature durability and low-temperature durability, and having low adsorption characteristic to strange taste and odor material. As to the casing and the impeller of the circulating pump and the body of the circulating electromagnetic solenoid valve, polyacetale, glass fiber reinforced PP or polysulfone is selected in view of satisfying high-temperature durability and low-temperature durability, crack resistance, dimensional accuracy and dimensional stability, and having low adsorption characteristic to strange taste and odor material. As to the three-way connector, stainless steel or polysulfone is selected in view of heat conductivity, high-temperature resistance and low-temperature resistance, dimensional accuracy, sharpness and durability for picking the sealing film of the pour out port of the BIB container and having low adsorption characteristic to strange taste and odor material. In case of stainless steel, it is preferable to select, for example, SUS316 or SUS304. As to the chilled water drain pipe, the hot water drain pipe and the drain pipe, it is preferable to select metal such as heat-conductive stainless steel and brass.

FIGS. 6 to 15 show an example of the dispenser according to the present invention, which is assembled into a water server.

Figure 8:
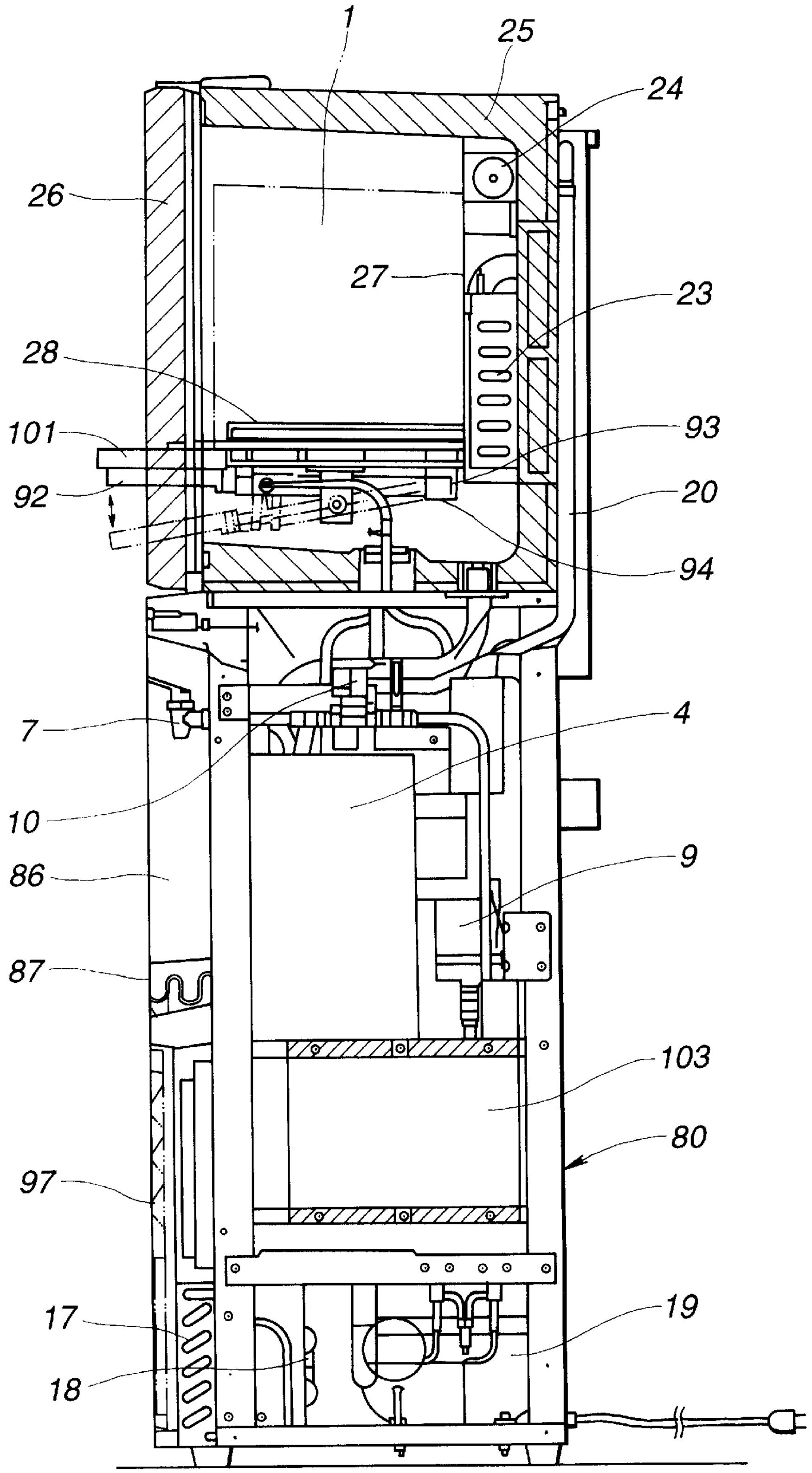
FIG. 8 is a cross-sectional side view of the water server of FIG. 6.

A longitudinal body 80 has a height of about 140 cm, a front-width of about 35 cm, a length of about 45 cm. The body 80 is arranged to have the door 26 of the refrigerator 25 at its upper portion and to be formed into a sealable box-shape as shown in FIGS. 1 and 8. In the body 80, an apparatus holding area 81 is disposed under the refrigerator 25. A panel 82 is installed at a lower portion of the door 26 and a front intermediate portion. The panel 82 includes a hot water optimum temperature lamp 83, a chilled water optimum temperature lamp 84 and a sanitation lamp 85. Further, at a lower portion of the panel 82, a depressed portion 86 is formed. The hot water pouring faucet 7 and the chilled water pouring faucet 8 are disposed at an upper portion of the depressed portion 86, and a detachable drain pan 87 for setting on a glass is disposed at a lower portion of the depressed portion 86.

As shown in FIG. 8, in the refrigerator 25 the evaporator 23 and an inbox fan motor 24 are fixed to a rear side in the refrigerator 25. An inboard partition wall 27 is hanged in front of the evaporator 23 and an inbox fan motor 24 surface. A shelf board 28 is horizontally disposed at a lower portion of the partition wall 27. The drinking water container 1 is disposed on the shelf board 28.

As shown in FIGS. 11 to 15, the shelf board 28 has a semi-circular cutout portion 98 opened toward the door in order to clamp the neck portion of the drinking water container outlet port 29. At front side of the cutout portion 98, triangular taper portions 99, 99 are formed so as to connect the front portion of the shelf board 28 and the cutout portion 98. A pair of finger hock portions 100, 100 of a semi-circular cutout portion 98 are disposed at both sides of the taper portion 99 at the shelf board 28. An end of a fixing lever 101 is rotatably fixed at a lower portion of the taper portion 99 disposed at the shelf board 28 so as to be parallel with the shelf board 28. When the fixing lever 101 is tightened, the lock state of the drinking water container 1 is established. In order that the drinking water container 1 is set on the shelf board 28, the lock of the fixing lever 101 is first released. Next, the drinking water container 1 is provisionally set at a front portion of the shelf board 28, and the neck portion of the drinking water container outlet port 29 is generally adjusted with the taper portion 99. Then, the drinking water container 1 is moved to the backward of the shelf board 28. By these operations, the neck portion of the outlet port 29 is accurately led toward the taper portion 99 and is easily engaged with the cutout portion 98. Therefore, the outlet port 29 is fixed at a position necessary for the connection with the dispenser. Further, by closing the fixing lever 101, the position of the outlet port 29 of the drinking water container 1 is fixed and the lock state is established.

A connecting lever 92 fixedly connecting the three-way connector 31 is disposed at a center and lower portion of the most-length portion of the cutout portion 98 so as to be swingable on a shaft 93 in the vertical direction. The sharp end portion 39*a* is set at the tip end portion of the three-way connector 31. A grip portion 92*a* of a front end portion of the connecting lever 92 is arranged to be swingable on an axis 95 in the right and left (horizontal) direction. A generally T-shaped guide 102 is disposed around the movable area of the connecting lever 92. A longitudinal portion of the guide 102 is formed into a generally U-shape opened upward so as to vertically guide the connecting lever 92. The shaft 93 is disposed at a supporting plate 94 fixed at a back center portion of the lower side of the shelf board 28.

Figure 13A:
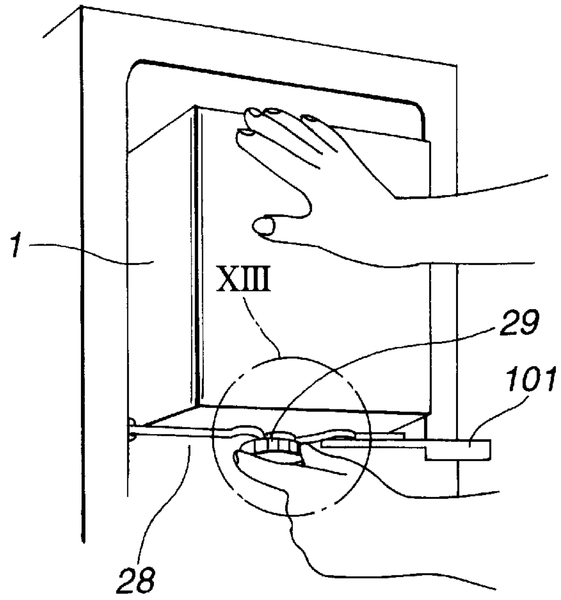
FIG. 13A is a perspective view showing a procedure for installing a drinking water container to a dispenser.
Figure 13B:
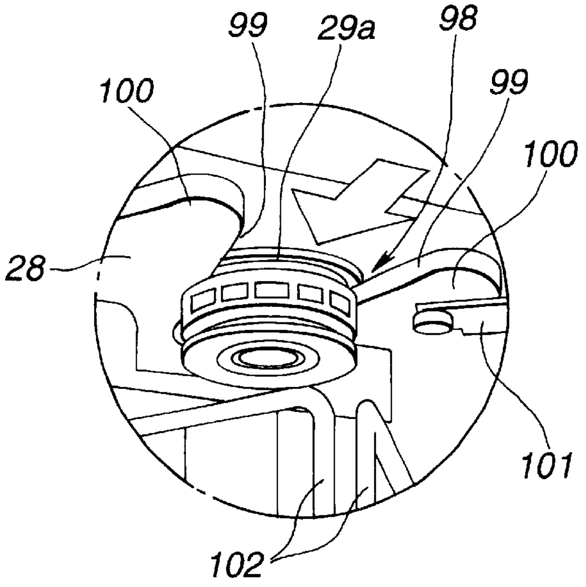
FIG. 13B is an enlarged view of a portion XIII of FIG. 13A.
Figure 14:
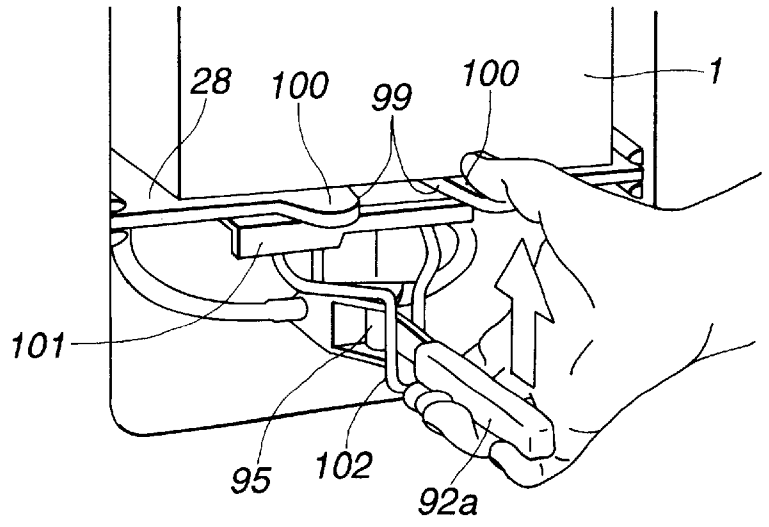
FIG. 14 is a perspective view showing a procedure for installing the drinking water container to the dispenser.
Figure 15:
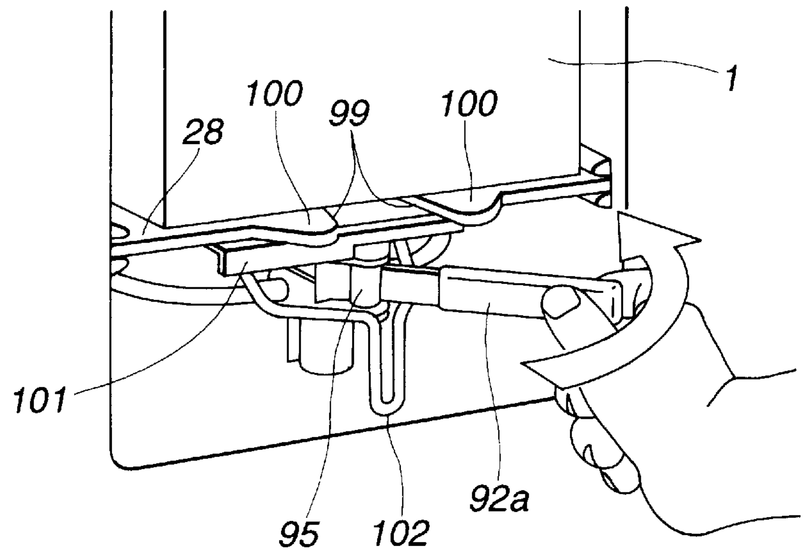
FIG. 15 is another perspective view showing a procedure for installing the drinking water container to the dispenser.

Accordingly, in case that the drinking water container 1 and the dispenser are connected with each other, as shown in FIGS. 13A and 13B, the drinking water container 1 is first put on the shelf board 28. Next, a groove portion 29*a* formed at the neck portion of the drinking water container 1 is engaged with the taper portions 99, 99 by inserting the outlet port 29 of the drinking water container 1 to the cutout portion 98, and the fixing lever 101 is fastened for locking as shown in FIG. 14. Then, upon stabilizing the hand by hocking the finger at the finger hock portion 100 of the shelf board 28, the grip portion 92*a* of the connecting lever 92 is moved upward along the vertical portion of the guide 102 by fingers. By these operations, the sharp end portion 39*a* of the three-way connector 31 is moved upward and is inserted into the inner of the outlet portion 29. Accordingly, the sealing film 29*c* set in the inner portion of the outlet port 29 is broken by the sharp end portion 39*a,* and the drinking water is flowed from the drinking water container 1 to the three-way connector 31 by means of its gravity. The connecting lever 92 is then set in a folded state by moving the grip portion 92*a* of the connecting lever 92 to one of the right and left directions after the sharp end portion 39*a* breaks the sealing film 29*c* of the inner portion of the outlet port 29, as shown in FIG. 15. Since the shaft 93 supporting the connecting lever 92 is fixed at a rear portion in the water dispenser, the fixed point of the shaft 93 is a fulcrum and has a predetermined distance with respect to a power point of the grip portion 92*a* of the connecting lever 92. Therefore, it is easy to firmly break the sealing film 29*c* of the inner portion of the outlet port 29 by small power with respect to the operating point of the sharp end portion 39*a* of the three-way connector 31. Further, since the connecting lever 92 may be moved along the guide 102, the operation thereof is correctly executed. Since the connecting lever 92 is supported by a horizontal portion of the guide 102 by laterally moving the grip portion 92*a* on the axis 95 toward one of right and left sides as shown in FIG. 15 after the breakage of the sealing film 29*c* of the outlet port of the drinking water container 1, the drop down of the connecting lever 92 is prevented by the guide 102 and is locked without release. Further, since the grip portion 92*a* of the connecting lever 92 is folded into a compact state, it is not necessary to provide a waste space in the refrigerator.

In case that the connection between the drinking water container 1 and the dispenser is released, the grip portion 92*a* of the connecting lever 92 is inversely moved in the lateral direction and the connecting lever 92 is moved downward upon being adjusted with the longitudinal portion of the guide 102. By these operations, the connection between the drinking water container 1 and the dispenser is released.

Figure 9:
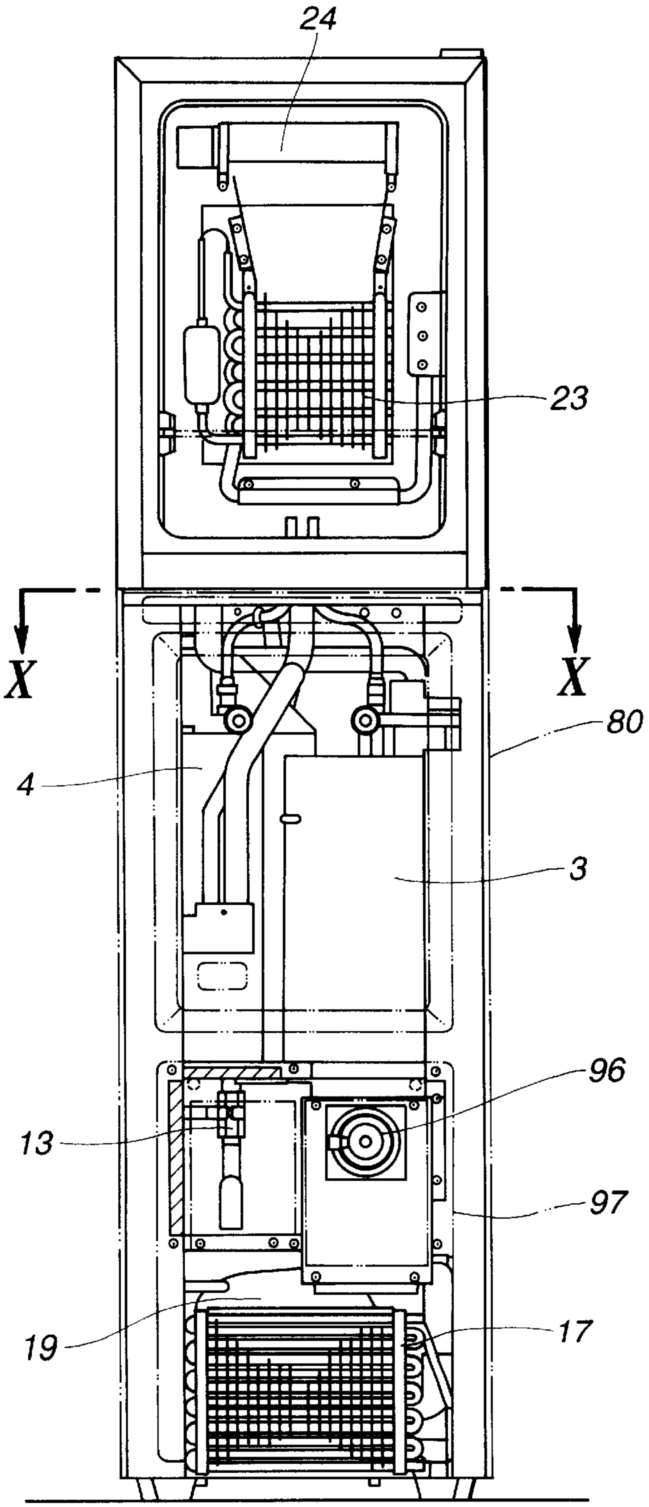
FIG. 9 is a back view of the water server of the water server of FIG. 6.
Figure 10:
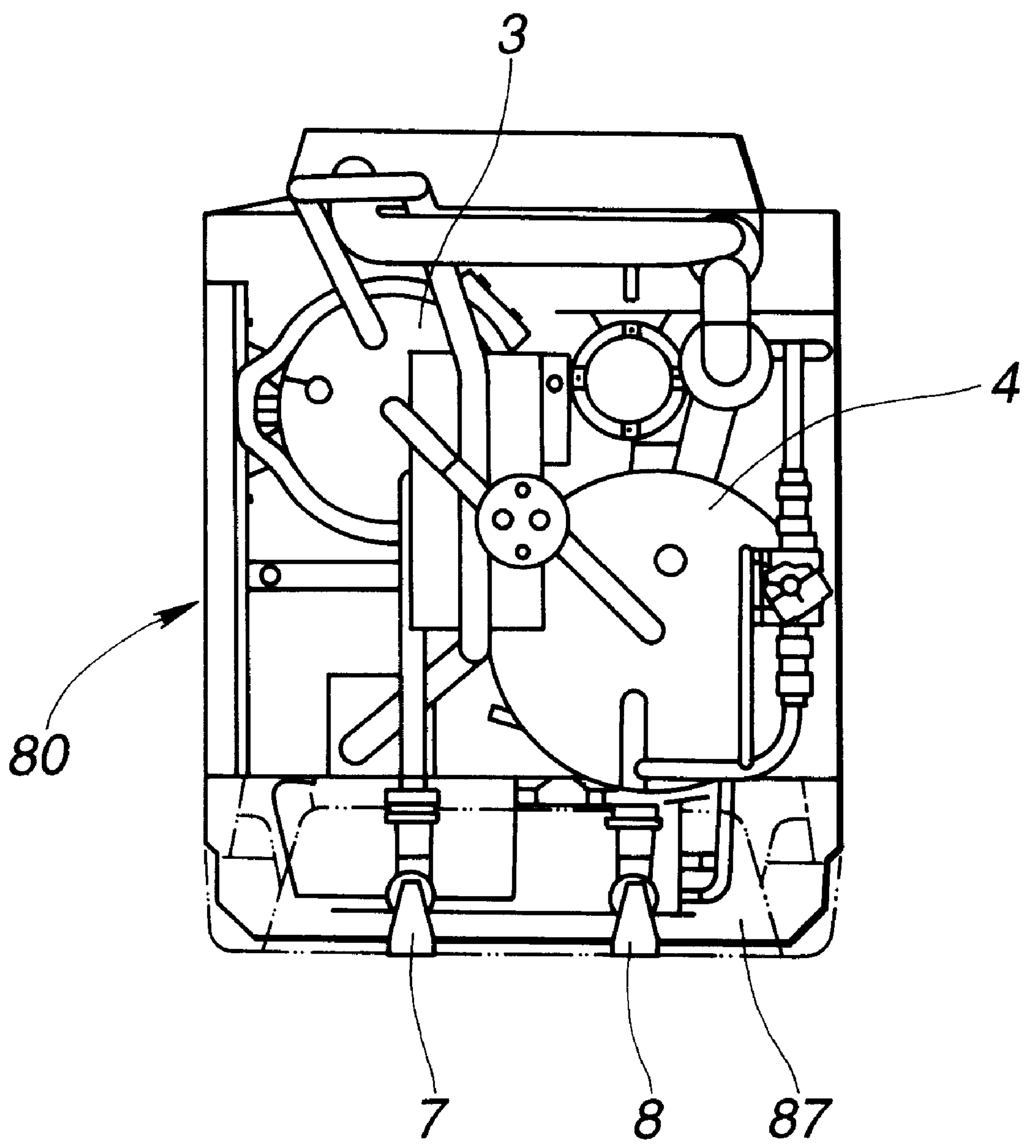
FIG. 10 is a cross sectional view taken along the direction of arrows X—X of FIG. 9.
Figure 11:
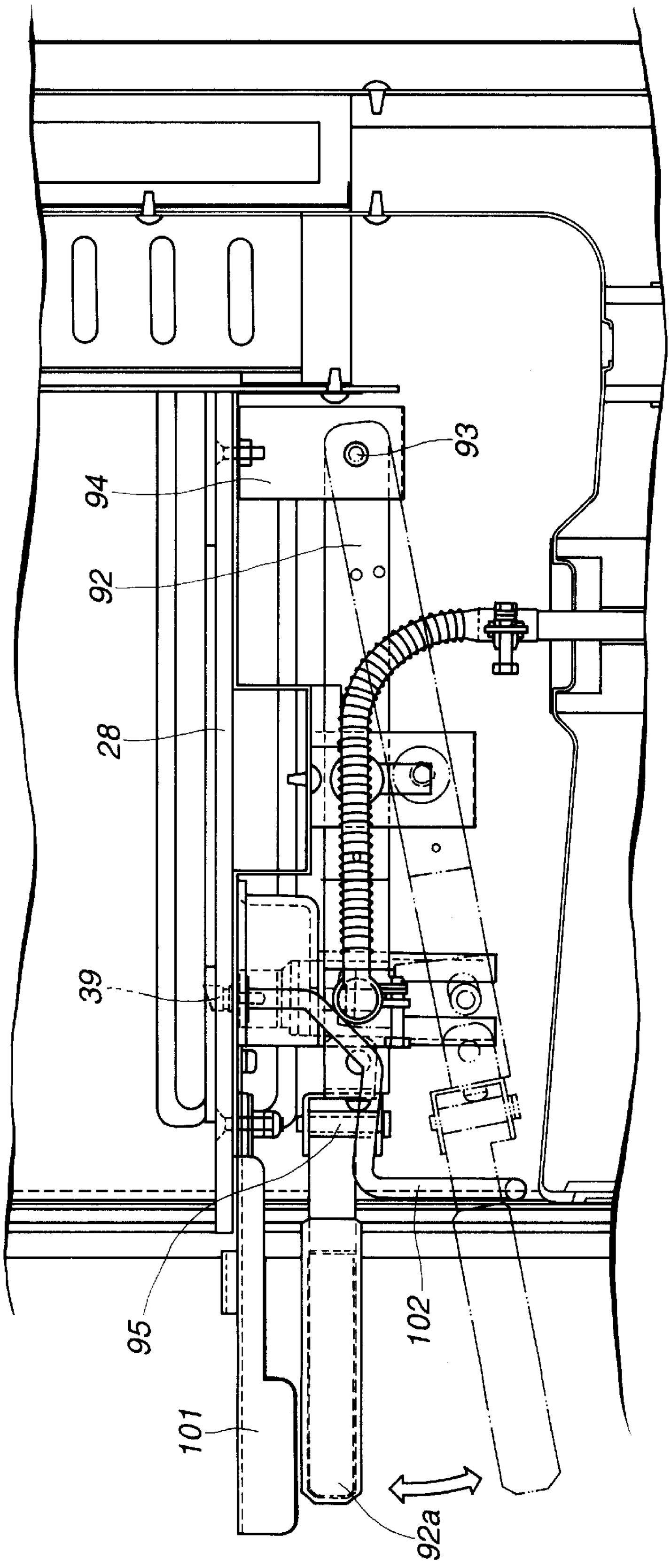
FIG. 11 is an enlarged partial view of FIG. 8.
Figure 12:
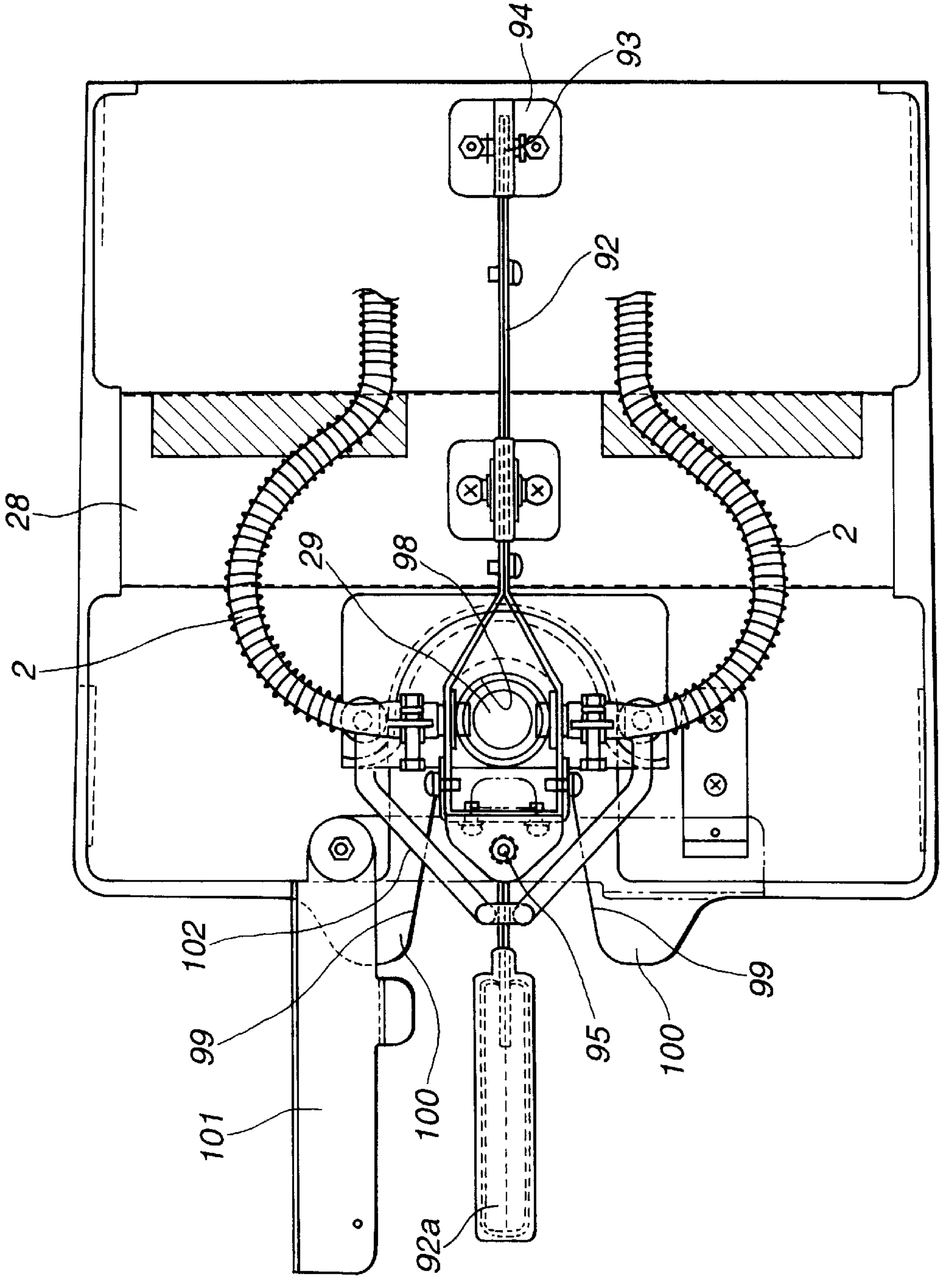
FIG. 12 is a bottom view of FIG. 11.

As shown in FIGS. 8 to 10, the hot water tank 3 and the chilled water tank 4 are disposed on a diagonal line in the apparatus holding area 81 under the refrigerator 25 while the circulating solenoid valve 10 is disposed thereon. The circulating pump 9 is disposed in the vicinity of the hot water tank 3 and the chilled water tank 4. Since the voluminous hot water tank 3 and chilled water tank 4 are diagonally disposed, the drinking water dispenser is designed compactly and the piping system thereof is arranged compactly. An electric equipment box 103 is disposed under the hot water tank 3 and the chilled water tank 4, and a sanitation timer 96 is disposed in front of the electric equipment box 103. The sanitation timer 96 controls the circulating solenoid valve 10 into an open state and the circulating pump 9 into an operating state at predetermined time intervals. In the electric equipment box 103, there is provided an electric circuit for returning the circulating solenoid valve 10 and the circulating pump 9 into an original state by turning off all of them when a time period necessary for executing the heat sterilization has elapsed. The hot water drain valve 13 is disposed at a side portion of the electrical equipment box 103. The condenser 17 and the condenser electric motor fan 18 are disposed at a front side under the electric equipment box 103 and the hot water drain valve 13. The electric compressor 19 is disposed at a most-length portion under the electric equipment box 103 and the hot water drain valve 13. In order to operate the hot water drain valve 13 and the sanitation timer 96, a cover 97 is detachably installed at a lower surface of the equipment. Further, a surface of the door 26 is arranged so as to freely display the quality and the manufacturer of the drinking water in the drinking water container 1 thereon.

By installing this arranged water server at an office or dining room and by turning on it, the inside of the refrigerator 25 is properly cooled by means of the evaporator 23 to enable the drinking water in the container 1 to be safely stored so as to suppress the increase of the microbe. Further, the drinking water W in the piping system flows in the direction shown by white allows in FIG. 1 to supply the suitably temperature-controlled water. The drinking water W flowing into the hot water tank 3 is heated by the heater 5, and the drinking water W flowing into the chilled water tank 4 is further cooled by the cooler 6. When the hot water optimum temperature lamp 83 and the chilled water optimum temperature lamp 84 of the panel 82 are turned on, the optimum hot water is poured out by pressing down the lever of the hot water pouring faucet 7, and the optimum chilled water is poured out by pressing down the lever of the chilled water pouring faucet 8.

By setting the sanitation timer 96 so that the heat sterilization of the piping system including the hot water tank 3 and the chilled water tank 4 is automatically executed at predetermined time intervals, when the set time elapsed, the sanitation lamp 85 of the panel 82 is flushed and the hot water optimum temperature lamp 83 and the chilled water optimum temperature lamp 84 are turned off. Further, the normally closed circulating solenoid valve 10 is opened and the circulating pump 9 is operated. Therefore, the water in the piping system flows in the direction indicated by black allows as shown in FIG. 1. The drinking water W heated in the hot water tank 3 is flowed into the chilled water tank 4 through the connecting pipe 11 and is flowed in the supply pipe 2. Then, the drinking water W is returned to the hot water tank 3. During the heat sterilization, the temperature of the drinking water W in the hot water tank 3 is set to be higher than or equal to 70° C. Therefore, the microbe contaminated into the supply pipe 2, the tanks 3 and 4 are all sterilized by the circulating hot water kept at high temperature. Further, by utilizing the heat conductivity of the metal of the parts when the hot water is circulated, the end portion of the system is also sterilized. When the preset time elapsed, the circulating solenoid valve 10 is closed and the circulating pump 9 is stopped. Further, the setting of the temperature of the heater 5 of the hot water tank is returned to the normal setting. With these operations, the heat sterilization is automatically terminated.

EXAMPLE

A dispenser (A) according to the present invention shown in FIGS. 1 to 15 was produced. As a reference, a dispensers (B), (C) and (D) were produced. The dispenser (B) was the same as the dispenser (A) except that the three-way connector 31 disposed in the vicinity of the connecting portion between the dispenser and the outlet port of the drinking water container was made of plastic. The dispenser (C) was the same as the dispenser (A) except that the three-way connector was connected to the piping system instead of the stainless steel I-shape joint including a sharp cylindrical portion which is employed in the conventional dispenser and that the I-shaped connector is located in the refrigerator. The dispenser (D) was the same as the dispenser (A) except that a conventional valve having no cutout portion is employed as the chilled water pouring faucet 8.

Each dispenser (A), (B), (C), (D) was arranged such that the temperature of the drinking water in the container 1 set in the refrigerator 25 was lower than 10° C., the temperature of the chilled water was set in a range from 4° C. to 10° C., and the temperature of the hot water was set in a range from 80° C. to 90° C. The effective content volume of each of the hot water tank 3 and the chilled water tank 4 was 2.7 litter. The heater installed in the hot water tank was 401 W.

Experiment I: Evaluation of Heat Sterilization Performance of Dispensers

By using *Spingomonas paucimobilis* (ATCC29837) and *Psudomonas fluorescens* Migula (ATCC13525) which are known as aquatic microbe, the growth of such microbe in mineral water was certified. After these microorganism were incubated in standard agar media at 27° C. for five days, one platinum loop of each incubated microorganism was suspended in 10 ml of mineral water. Further, each suspension was diluted by the mineral water to the concentration of about $10^2$ CFU/ml, and each diluted specimen was incubated at 27° C. for five days. After the incubation, each incubated fluid was suspended with 10 litters of mineral water wherein a marketed new BIB container and incubated at 25° C. for 48 hours to obtain two kind of microorganism mineral water. The concentration of the microorganism mineral water including *Spingomonas paucimobilis* was $1.76\times10^5$ CFU/ml, and the concentration of the microorganism mineral water including *Psudomonas fluorescens* Migula was $3.04\times10^6$ CFU/ml.

By using the two kinds of microorganism mineral water, the following experiment of the dispenser (A) according to the present invention was executed. After 70%-ethanol aqueous solution was circulated in the dispenser (A) for five minutes, a marketed new BIB container 1 in which 10 litters of mineral water is filled, was connected to the dispenser. The mineral water was circulated in the dispenser (A) while being poured out to discharge the ethanol aqueous solution in the dispenser. Then, the drain valves 13 and 14 were opened to drain all of the mineral water in the dispenser. Under this condition, a BIB container filled with the microorganism mineral water was connected to the dispenser. After it was confirmed that the chilled water tank was filled with the microorganism mineral water, 200 ml of the microorganism chilled water was poured through the chilled water pouring faucet 8 and was treated as a specimen I. At this time, since the dispenser is filled with only the microorganism mineral water from the BIB container 1 of the microorganism mineral water and since the water was poured from the chilled water pouring faucet 8, the microorganism mineral water reached all of the dispenser, that is, reached at an end of the pouring faucet.

Next, the BIB container 1 of the microorganism mineral water was detached from the dispenser, and a marketed new BIB container filled with 10 litters of mineral water was connected to the dispenser. Then, the heat sterilization apparatus of the dispenser was operated. The heat sterilization apparatus of the dispenser was set such that a heater 5 set in a hot water tank 3 stops heating when the temperature of hot water in the hot water tank is greater than or equal to 70° C., and that a circulating pump is operated for 60 minutes. During this period, the tanks 3 and 4 and the piping system of the dispenser was filled with the microorganism mineral water of the BIB container 1 previously connected to the dispenser.

Just after the heat sterilization, 200 ml of the water corresponding to a cup of water was obtained through the chilled water pouring faucet 8 and was treated as a specimen II. After 2 hours elapsed from the heat sterilization, 200 ml of the water corresponding to a cup of water was obtained through the chilled water pouring faucet 8 and was treated as a specimen III. Following this, in order to pour more than half of the volume of the chilled water tank 4, 1500 ml of the chilled water was poured and was treated as a specimen IV.

As to each specimen, the microbe test was carried out. The microbe test was executed such that 0.1 ml of the specimen was diluted into 1 to 100 times. The diluted specimen was spread on a standard agar media and was incubated at 27° C. for 7 days. A colony count of the incubated specimen was measured. The result thereof is shown in Table 1.

TABLE 1

| | Microorganism mineral water including Spingomonas paucimobilis | Microorganism mineral water including Psudomonas fluorescens Migula |
|---|---|---|
| Microorganism mineral water | $1.76 \times 10^5$ CFU/ml | $3.04 \times 10^6$ CFU/ml |
| SPECIMEN I (microorganism water installed time) | $1.46 \times 10^3$ CFU/ml | $3.81 \times 10^4$ CFU/ml |
| SPECIMEN II (just after heat sterilization) | 10 CFU/ml or less | 10 CFU/ml or less |
| SPECIMEN III (2 hours later from sterilization; 200 ml) | 10 CFU/ml or less | 5 CFU/ml |
| SPECIMEN IV (2 hours later from sterilization; 1500 ml) | 75 CFU/ml | 75 CFU/ml |

Consequently, it was proved that the dispenser of the present invention sufficiently performed sterilization by operating the heat sterilization apparatus even if microbes grow in the dispenser.

Experiment II: Confirmation of Heating Effect by Heat Sterilization of Parts of Dispensers By using the dispenser (A) of the present invention and the dispensers (B) and (C) produced as a reference, the heating effect by the heat sterilization of each part in the dispenser was confirmed by the following experiment. As a scale of the heat sterilization, it was assumed that the temperature thereof was kept at 55° C. for more than 5 minutes.

At 35° C. room temperature, a marketed new BIB container 1 filled with 10 litters of mineral water was connected to the dispenser. Then, one hour later the experiment was started. At this time, the temperature of the drinking water in the BIB container 1 set in the refrigerator 25 in the dispenser was 14° C.

The heat sterilization apparatus of each dispenser was set to stop the heating when the temperature of hot water in the hot water tank 3 is higher than 70° C. by means of the heating of the heater 5. The circulating pump 9 was set to operate for 70 minutes. During a period from the start of the circulating pump 9 to 90 minutes later, the temperature of each portion of the dispenser was measured to observe the time elapsed change. During this period, in the dispenser (A), a base part A of the tapered cylinder portion 39 of the three-way connector 31, a body center part b of the three-way connector 31 and a pipe part c of the piping system in refrigerator connected to the hot water tank 3 were measured. In the dispenser (B), a base part a' of the tapered cylinder portion 39 of the three-way connector 31, a body center part b' of the three-way connector 31 and a pipe part c' of the piping system in refrigerator connected to the hot water tank were measured. In the dispenser (C), a part d of the I-connector located near the outlet port of the drinking water container 1, a center part e of the I type connector, a part f of the I-connector near the piping system, and a connecting portion part g between the I-connector and the piping system were measured.

At the body center part b, b' of the three-way connector 31 and the pipe c, c' of the piping system in refrigerator connected to the hot water tank 3 of each of the dispensers (A) and (B), the temperatures were raised from the start of the circulating pump and were reached at 55° C. in 17 minutes. Further, the temperatures were raised and reached maximum 75° C., and were then lowered from the time when the heater attached to the hot water tank was turned off. At the time when 90 minutes elapsed from the start of the heater, the temperature was 63° C. At the tapered cylindrical portion base part a of the three-way connector 31 of the dispenser (A) according to the present invention, the temperature was raised from the start of the circulating pump and was reached 55° C. in 33 minutes. Further, the temperatures were raised and reached maximum 65° C., and were then lowered from the time when the heater 5 was turned off. At the time when 90 minutes elapsed from the start of the heater 5, the temperature was 57° C. At the tapered cylindrical portion base part a' of the plastic three-way connector 31 of the dispenser (B), the temperature was deviated within a range from 28° C. to maximum 52° C.

As to the dispenser (C), at the connecting part g between the I-connector and the piping system, the temperature was raised from the start of the circulating pump 9 and was reached 55° C. in 22 minutes. Further, the temperatures was raised and reached maximum 74° C., and was then lowered from the time when the heater 5 was turned off. At the time when 90 minutes elapsed from the start of the heater 5, the temperature was 61° C. At the part d of the I-connector near the outlet port of the drinking water container 1, the temperature was raised from 26 minutes later of the start of the circulating pump and reached maximum 45° C. The temperature was then lowered from the time when the heater 5 was turned off. At the time when 90 minutes elapsed from the start of the heater 5, the temperature was 26° C. At the center part e of the I-connector, the temperature was raised from the time 26 minutes elapsed from the start of the circulating pump 9 and reached maximum 45° C. The temperature was then lowered from the time when the heater 5 was turned off. At the time when 90 minutes elapsed from the start of the heater 5, the temperature was 26° C. At the part f of the I-connector near the piping system, the temperature was raised from the time 8 minutes elapsed from the start of the circulating pump 9 and reached maximum 57° C. The temperature more than 55° C. was kept for 4 minutes. The temperature was then lowered from the time when the heater 5 was turned off. At the time when 90 minutes elapsed from the start of the heater 5, the temperature was 45° C.

As a result, in case that it was defined that the sterilization enabling temperature and the period thereof to be followed were 55° C. or more and at least 5 minutes, regarding the dispenser (A) according to the present invention, all of the tapered cylindrical portion base part a of the three-way connector 31, the body center part b of the three-way connector 31 and the pipe c of the piping system in refrigerator achieved the sterilization condition to keep 55° C. or more for at least 5 minutes.

In the dispenser (B), only the tapered cylindrical portion base part a' of the plastic three-way connector 31 did not reach the temperature greater than 55° C., and therefore the sterilization effect was not ensured.

In the dispenser (A), since the three-way connector 31 was made of metal, the temperature thereof was raised by the circulation of hot water and the end portion of the three-way connector was raised by the heat conductivity thereof. Therefore, it was deemed that the temperature of the sharp cylindrical portion base part a of the three-way connector 31 was raised at 55° C. or more and kept at the same for 5 minutes or more than. However, it was deemed that at the taper cylindrical portion base part a' of the plastic three-way connector 31 of the dispenser (B), the temperature thereof was almost not raised and is largely affected by the temperature of the chilled drinking water from the BIB container 1, and therefore the temperature was not raised.

In the dispenser (C), since no part of the I-connector was kept at 55° C. or more for 5 minutes or more, the heat sterilization effect could not be ensured. The reason for this was deemed that the hot water was not circulated in the I-connector and the chilled water from the BIB container 1 was flowed in the I-connector, and the I-connector was disposed in the refrigerator 25 to keep the drinking water under the cooled condition. Therefore, even if the I-connector received the heat of the hot water circulated in the vicinity of the I-connector and utilized its heat conductivity, the temperature of the I-connector was not raised. The I-connector is located at a most upstream portion in the dispenser. Therefore, if the contamination or growth of microbe is generated at this part, whole of the dispenser is contaminated according to the use of the dispenser. That is, the I-connector is the most important part in sterilization.

Additionally, in the dispenser (A) according to the present invention, at the chilled water pouring faucet 8 base part, the circulating solenoid valve 10, the circulating pump 9, the hot water tank bottom portion, the chilled water tank bottom portion and the chilled water drain valve 14 connected to the chilled water tank through the drain pipe, the temperatures thereof were measured. Each temperature was raised from the start of the circulating pump and was kept at 55° C. or most for at least 30 minutes. Furthermore, in the dispenser (A) according to the present invention, the temperature of the drinking water in the BIB container 1 set in the refrigerator 25 and the temperature in the refrigerator 25 were measured. The temperatures of the drinking water in the BIB container 1 and the temperature in the refrigerator 25 were raised by at most 520 C. but were not significantly changed. Accordingly, the inside of the refrigerator 25 and the drinking water in the BIB container 1 set in the refrigerator 25 are kept cool. That is, it is not necessary to excessively execute the cooling after the heat sterilization, and the low temperature for suppressing the growth of microbe in the drinking water in the BIB container 1 is maintained.

Experiment III: Effect of the Cutout Portion of the Water Outlet Portion of the Chilled Water Pouring Faucet As to a microbe contamination of two portions of the water outlet tip end portion of the chilled water pouring faucet 8 and the water outlet tip end portion of the hot water pouring faucet 7 which are parts exposed to outside air, a marketed dispenser set in a room of an office was observed. The observation method was as follows: First, the water outlet tip end portions were wiped by a cotton swab wetted by aseptic water. The wiped cotton swab was washed by 1.0 ml aseptic water in a test tube. 0.1 ml of the washing water is mixed with and diluted by medium. Then, the washing water medium was incubated, and the colony count of the incubated specimen was counted. As a result of the observation, at the water outlet tip end portion of the chilled water pouring faucet 8 of the dispenser, $10^3$ CFU/ml or more of microbe was detected, and at the water outlet tip end portion of the hot water pouring faucet 7, 10 CFU/ml or less of microbe was detected. Microbe detected at the water outlet tip end portion and observation of remaining water in the water outlet tip end portion, it concluded that the microbe was attached to the water outlet from outside and the attached microbe was grown in the remaining water in the water outlet tip end portion. Therefore, in order to certify the effect for suppressing the growth of microbe at the chilled water pouring faucet 8, the following experiment was executed by using the dispenser (D) which was produced as a reference of the dispenser (A) of the present invention. As mentioned above, the chilled water pouring faucet 8 of the dispenser (D) did not have a cutout portion.

Strains of *Spingomonas paucimobilis* (ATCC29837) and *Psudomonas fluorescens* Migula (ATCC13525), which were used in the above experiment I, were incubated in standard agar media at 27° C. for five days. Then, one platinum loop of each incubated microorganism was suspended in 10 ml of mineral water. Further, each suspension was diluted by mineral water to the concentration of about $10^2$ CFU/ml, and each diluted specimen was incubated at 27° C. for five days. After the incubation, each incubated fluid was suspended with 10 litters of mineral water wherein a marketed new BIB container 1 and incubated at 25° C. for 48 hours to obtain two kinds of microorganism mineral water. The concentration of the microbe was $2.40\times10^5$ CFU/ml.

After the dispenser was put in full empty condition where all drinking water was discharged, the BIB container 1 filled with the microorganism mineral water was connected to the dispenser. After it was checked that the chilled water tank was fully filled with the microorganism water, 500 ml of the water was poured from the chilled water pouring faucet. At this time, since only the microorganism mineral water from the BIB container 1 filled with the microorganism mineral water was existed in the dispenser, the microorganism mineral water reached whole of the dispenser by pouring the water through the chilled water pouring faucet 8. This means that the water fully reached the end of the pouring faucet 7, 8. Thereafter, the BIB container 1 of the microorganism mineral water was detached from the dispenser, and a marketed new BIB container 1 filled with 10 litters of mineral water was connected to the dispenser. Then, the heat sterilization apparatus was operated. The heat sterilization apparatus of the dispenser was set such that the heater 5 set in the hot water tank 3 stops heating when the temperature of hot water in the hot water tank 3 is greater than or equal to 70° C., and that a circulating pump 9 is operated for 120 minutes. During this period, the tanks and the piping system of the dispenser were filled with the microorganism mineral water of the BIB container 1 previously connected to the dispenser.

After the heat sterilization, the dispenser was left for one day without being used so as to maintain a condition that the mineral water was still stayed in the dispenser. After such one day leaving of the dispenser, the water was poured from the chilled water pouring faucet 8 by 1 litter. First 10 ml and last 10 ml of each 1 litter of the water were sampled and tested as to microbe. Further, 10 days later, a marketed new BIB container filled with 10 litters of mineral water was connected to the dispenser. Then, the water was similarly sampled and tested as to microbe. This observation was executed to confirm the periodical change of the count of microbe according to the stayed time of the mineral water in the dispenser after the heat sterilization. The first 10 ml of the poured 1 litter was a sample including water remained in the water outlet tip end portion of the chilled water pouring faucet 8, and the last 10 ml thereof was a sample including mineral water in the tank which is free from the water remained at the water outlet tip end portion.

After the one day leaving of the dispenser, the heat sterilization apparatus of the dispenser was not operated. The microbe test was executed such that 0.1 ml of each specimen was smeared on a standard agar media and incubated at 23° C. for 7 days, and that the colony count thereof was counted.

As a result, in the dispenser (D), the microbe of the first 10 ml on the first day was $1.68\times10^6$ CFU/ml, and the microbe of the last 10 ml on the first day was $9.52\times10^3$ CFU/ml. In the dispenser (A), the microbe of the first 10 ml on the first day was 220 CFU/ml, and the microbe of the last 10 ml on the first day was 11 CFU/ml. Then, in the dispenser (D), the microbe of the first 10 ml on the second day was $2.20\times10^5$ CFU/ml, and the microbe of the last 10 ml on the second day was $1.15\times10^3$ CFU/ml. The microbe of the first 10 ml on the third day was $2.18\times10^5$ CFU/ml, and the microbe of the last 10 ml on the third day was $1.06\times10^3$ CFU/ml. The microbe of the first 10 ml on the fourth day was $1.17\times10^4$ CFU/ml, and the microbe of the last 10 ml on the fourth day was 556 CFU/ml. During a period from the fifth day to the twentieth day, the detected count of microbe was similar to that of the fourth day.

In the dispenser (A) of the present invention, although during a period from the second day to the fifth day the count of microbe was detected as was similar to that of the first day, after the fifth day the microbe in both of the first 10 ml and the last 10 ml was within a range from 0 to at most 14.

As mentioned above, since the dispenser (A) according to the present invention has been arranged such that the cutout portion is set at the water outlet tip end portion of the chilled water pouring faucet 8, the drinking water is prevented from remaining at the water outlet portion of the chilled water pouring faucet 8. As a result, the growth of microbe at this part was prevented. It was deemed that the microbe attached to the water outlet portion and grew in the remaining water in case that the water outlet portion of the chilled water pouring faucet 8 was not sufficiently heated during the heat sterilization. The reason why microbe was not detected at the water outlet tip end portion of the hot water pouring faucet was that since the temperature of the hot water poured from the hot water pouring faucet was kept at 55° C., even if microbe was attached to the water outlet tip end portion of the hot water pouring faucet, the portion was always put in the heat sterilization condition due to the pouring of the hot water. Therefore, microbe died and did not grow.

According to the present invention as mentioned above, the heat sterilization apparatus, that is, the heater 5 has been arranged only at the hot water tank 3, and the provision of the heater to the part of the piping system and the chilled water tank was facilitated. Therefore, the number of the installed portions of the heater was decreased and the consumed electric power was decreased. Accordingly, the production cost of the equipment and the running cost of the dispenser were decreased.

Further, since the three-way connector has been disposed in the vicinity of the connecting portion to the outlet port of the drinking water container 1 and the chilled water pouring faucet 8 has been disposed in the vicinity of the piping system, the heat sterilization by circulating hot water was effectively executed as to the whole of the dispenser. Furthermore, since the three-way connector 31 and the drain valves 13 and 14 have been made of metal having high heat conductivity, it becomes possible to heat a circumferential portion of these parts. The parts connected to drinking water in the dispenser, which are located at a nearer portion to the connecting portion as compared with the three-way connector 31 which was not directly sterilized by circulating hot water, were set in the refrigerator 25 under the sealed state and put in the low temperature atmosphere. Therefore, they have been put in a condition that the growth of microbe was difficult. Further, it is arranged that the drinking water container 1 is received in the refrigerator 25. By this arrangement of the dispenser and the heat sterilization by circulating hot water, the safety of drinking water in the dispenser with respect to microbe is strictly ensured. Even when the drinking water container 1 is attached and detached to and from the dispenser, the portions in contact with the drinking water are not usually touched by men and therefore there is almost not the possibility of the invasion of microbe.

Further, since the taper portion 99, the cutout portion 98, the guide portion 102 and the connecting lever 92 are provided, the operation of attaching and detaching the drinking water container 1 is easily and firmly executed by small force and the drinking water container 1 is never detached in occupied condition. Further, since the connecting lever 92 is folded in a normal condition except for the attaching and detaching operation, it is compactly received and effective in space.

Even if drinking water having delicate natural character such as natural mineral water is employed in the dispenser according to the present invention, the parts in contact with the drinking water in the dispenser does not apply strange taste and odor to the drinking water. Further, since the material which prevents strange taste and odor from being applied to the parts, is selected and used, the dispenser according to the present invention never degrades the delicate taste and never adds strange taste and odor to the water even if it is continuously used for long period.

Furthermore, Since the drinking water container 1 having a large volume is received in an upper portion of the dispenser and the hot water tank 7 and the chilled water tank 8 are diagonally arranged at the lower portion, it becomes possible to produce the apparatus of the dispenser compactly.

The entire disclosure of Japanese Patent Application No. 9-358667 filed on Dec. 26, 1997 including specification, claims, drawings and summary are incorporated herein by reference in its entirety.

What is claimed is:

1. A drinking water dispenser for supplying drinking water from a detachable water container, comprising:

a hot water tank heating and storing the drinking water supplied from the water container;

a chilled water tank cooling and storing the drinking water supplied from the water container;

a supplied pipe connecting the detachable water container with said hot water tank and said chilled water tank;

a three-way connector having first, second and third ports, the first port being connected to the water container, the second and third ports being connected to said supply pipe through which the drinking water of the water container is supplied to said hot water tank and said chilled water tank, respectively;

a sterilization system for sterilizing said hot water tank, said chilled water tank and said supply pipe by circulating hot water among them, said sterilization system comprising a connecting pipe connecting said hot water tank and said chilled water tank, a circulating pump and a circulating solenoid valve for controlling the circulation of hot water for sterilization; and a refrigerator in which the detachable water container is detachably provided and is cooled, said three-way connector being disposed in said refrigerator.

2. A drinking water dispenser as claimed in claim 1, wherein said sterilization system further comprises a timer for controlling the circulating pump and the circulating solenoid valve.

3. A drinking water dispenser as claimed in claim 1, and further comprising a faucet, wherein said hot water tank, said chilled water tank, valve, faucet, said supply pipe, the connecting pipe, the circulating pump and the circulating solenoid valve are made of material which does not affect natural character of the drinking water.

4. A drinking water dispenser as claimed in claim 3, further comprising hoses for connecting the pipes, said hot water tank and said chilled water tank, said hoses being coated by synthetic resin which does not affect the natural character of the drinking water.

5. A drinking water dispenser as claimed in claim 1, further comprising a chilled water pouring faucet connected to said chilled water tank, said chilled water pouring faucet including a water outlet portion which has a cutout portion.

6. A drinking water dispenser as claimed in claim 1, wherein said refrigerator is disposed on said hot water tank and said chilled water tank which are diagonally arranged with respect to a rectangular shape of said refrigerator, and a refrigeration system executes refrigeration for said chilled water tank and said refrigerator, said refrigeration system comprising an electric compressor, a condenser, an evaporator for said chilled water tank and an evaporator for said refrigerator, the electric compressor and the condenser of said refrigeration system being disposed under said hot water tank and said chilled water tank.

7. A drinking water dispenser as claimed in claim 1, wherein the first port of said three-way connector has a tapered cylindrical portion having a sharp end portion which penetrates a sealing film of the detachable water container so that the water of the detachable water container is supplied to said hot water tank and chilled water tank.

8. A drinking water dispenser as claimed in claim 1, wherein disposed in said refrigerator are a shelf board for setting the water container thereon, a connecting lever which is fixedly connected with the three-way connector so as to be swingable in vertical direction, a guide for guiding the connecting lever, the shelf board having a semi-circular cutout portion and a pair of tapered portions continuous with the semi-circular cutout portion.

9. A drinking water dispenser as claimed in claim 8, wherein a neck portion of the detachable water container is fitted with the shelf board and is connected with said three-way connector by vertically and upwardly swinging the connector lever and horizontally turning the connector lever.

* * * * *